(12) United States Patent
Dumant et al.

(10) Patent No.: US 8,190,620 B2
(45) Date of Patent: May 29, 2012

(54) APPARATUS AND METHOD FOR VISUALIZING DATA WITHIN A DECOMPOSITION GRAPH

(75) Inventors: Bruno Andre Marie Dumant, Yvelines (FR); Alexis-Jean Laurent Naïbo, Hauts de Seine (FR); Jean-Claude Grosselin, Viroflay (FR)

(73) Assignee: Business Objects Software Ltd, Dubin (IE)

( * ) Notice: Subject to any disclaimer, the term of this patent is extended or adjusted under 35 U.S.C. 154(b) by 664 days.

(21) Appl. No.: 11/871,959

(22) Filed: Oct. 12, 2007

(65) Prior Publication Data
US 2009/0100086 A1    Apr. 16, 2009

(51) Int. Cl.
  G06F 7/00    (2006.01)
  G06F 17/30    (2006.01)
(52) U.S. Cl. .......................................... 707/754; 707/778
(58) Field of Classification Search .................. 707/754, 707/778
See application file for complete search history.

(56) References Cited

U.S. PATENT DOCUMENTS

| | | | |
|---|---|---|---|
| 6,769,032 B1* | 7/2004 | Katiyar et al. | 709/246 |
| 6,781,961 B1* | 8/2004 | Gunsay | 370/255 |
| 2004/0243576 A1* | 12/2004 | Shrivastava et al. | 707/5 |
| 2005/0050477 A1* | 3/2005 | Robertson et al. | 715/853 |
| 2006/0007731 A1* | 1/2006 | Dumitru et al. | 365/185.01 |
| 2006/0085445 A1* | 4/2006 | Thanu | 707/100 |
| 2006/0206512 A1* | 9/2006 | Hanrahan et al. | 707/102 |
| 2006/0259509 A1* | 11/2006 | Stolte et al. | 707/102 |
| 2007/0094241 A1* | 4/2007 | Blackwell et al. | 707/3 |
| 2007/0130116 A1* | 6/2007 | Cras et al. | 707/2 |

OTHER PUBLICATIONS

Svetlanna Mansmann and Marc H. Scholl, 2007, "Exploring OLAP Aggregates with Hierarchical Visualization Techniques", SAC '07, ACM Press, Seoul, 1-59593-480-4.

* cited by examiner

Primary Examiner — Cam Truong
(74) Attorney, Agent, or Firm — Mintz, Levin, Cohn, Ferris, Glovsky and Popeo, P.C.

(57) ABSTRACT

A computer readable storage medium includes executable instructions to provide a decomposition graph visualization with a set of nodes. A selection of two or more measures is received. A measure visualization is generated for each node to illustrate a relationship between the two or more measures.

17 Claims, 8 Drawing Sheets

APPARATUS AND METHOD FOR VISUALIZING DATA WITHIN A DECOMPOSITION GRAPH

BRIEF DESCRIPTION OF THE INVENTION

This invention relates generally to data visualization. More particularly, this invention relates to performing data visualization within a decomposition graph.

BACKGROUND OF THE INVENTION

Business Intelligence (BI) generally refers to a category of software systems and applications used to improve business enterprise decision-making and governance. These software tools provide techniques for analyzing and leveraging enterprise applications and data. These tools are commonly applied to financial, human resource, marketing, sales, service provision, and customer and supplier analyses. More specifically, these tools can include: reporting and analysis tools to analyze, forecast and present information, content delivery infrastructure systems for delivery, storage and management of reports and analytics, data warehousing systems for cleansing and consolidating information from disparate sources, and integration tools to analyze and generate workflows based on enterprise systems. Business Intelligence tools work with data management systems, such as relational databases or On Line Analytic Processing (OLAP) systems used to collect, store, and manage raw data and transactional enterprise systems that generate data. A subset of business intelligence tools are reports, OLAP systems, Enterprise Information Management (EIM) systems, Extract Transform and Load (ETL) systems, Dashboard, Analytics, and the like.

There are a number of commercially available products to produce reports from stored data. For instance, Business Objects sells a number of widely used report generation products, including Crystal Reports™, Business Objects Voyager™, Business Objects Web Intelligence™, and Business Objects Enterprise™. As used herein, the term report refers to information automatically retrieved (i.e., in response to computer executable instructions) from a data source (e.g. a database, a data warehouse, a plurality of reports, and the like), where the information is structured in accordance with a report schema that specifies the form in which the information should be presented. A non-report is an electronic document that is constructed without the automatic retrieval of information from a data source. Examples of non-report electronic documents include typical business application documents, such as a word processor document, a presentation document, and the like.

Dashboards provide the user with a graphical user interface that enables a user to see key data items. A dashboard may be defined such that an individual can use the dashboard to track metrics associated with performance objectives. In this way, a dashboard can provide charts, gauges, traffic light visualizations and alerts that provide a quick summary of the degree to which performance goals are being met.

A report document may provide a similar interface to the underlying data as a dashboard. A report document specifies how to access data and format it. A report document where the content does not include external data, either saved within the report or accessed live, is a template document for a report rather than a report document. Unlike, other non-report documents that may optionally import external data within a document, a report document by design is primarily a medium for accessing and, formatting, transforming and or presenting external data.

A report is specifically designed to facilitate working with external data sources. In addition to information regarding external data source connection drivers, the report may specify advanced filtering of data, information for combining data from different external data sources, information for updating join structures and relationships in report data, and instructions including logic to support a more complex internal data model (that may include additional constraints, relationships, and metadata).

In contrast to a spreadsheet type application, a report generation tool is generally not limited to a table structure but can support a range of structures, such as sections, cross-tables, synchronized tables, sub-reports, hybrid charts, and the like. A report design tool is designed primarily to support imported external data, whereas a spreadsheet application equally facilitates manually entered data and imported data. In both cases, a spreadsheet application applies a spatial logic that is based on the table cell layout within the spreadsheet in order to interpret data and perform calculations on the data. In contrast, a report design tool is not limited to logic that is based on the display of the data, but rather can interpret the data and perform calculations based on the original (or a redefined) data structure and meaning of the imported data. The report may also interpret the data and perform calculations based on pre-existing relationships between elements of imported data. Spreadsheets applications Generally work within a looping calculation model, whereas a report generation tool may support a range of calculation models. Although there may be an overlap in the function of a spreadsheet document and a report document, the applications used to generate these documents contain instructions with express different assumptions concerning the existence of an external data source and different logical approaches to interpreting and manipulating imported data.

Reports, dashboards and other BI analytic tools often use graphical representations of data to help users understand and navigate data results. While current decomposition trees show the breakdown of basic information over a series of dimensions, they do not provide advanced data visualization. A user is generally supplied with raw data, possibly with a basic summary such as a count for individual dimension members. This does not provide the user with the flexibility to compare and aggregate data.

In view of the foregoing, it would be helpful to provide a solution that allows users to compare the breakdown of complex measures, such as profit, revenue, attrition, growth and the like, over a series of dimensions. Moreover, the flexibility to compare data for multiple measures and dimension members, aggregate data for a desired selection of dimension members and filter data would provide an improvement over existing techniques.

SUMMARY OF INVENTION

The invention includes a computer readable storage medium with executable instructions to provide a decomposition graph visualization with a set of nodes. A selection of two or more measures is received. A measure visualization is generated for each node to illustrate a relationship between the two or more measures.

The invention also includes a computer readable storage medium with executable instructions to provide a decomposition graph visualization with a set of levels of nodes, where a level of nodes is associated with a dimension. A selection of two or more nodes from a single level in the set of levels of nodes is received. A node in a level corresponds to one or more dimension members of the dimension associated with the level. A new level of nodes is generated. A node in the new level of nodes displays a measure visualization containing data for the dimension members corresponding to the two or more nodes.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The following terminology is used while disclosing embodiments of the invention:

A decomposition graph is a visualization of a set of levels of nodes. A decomposition graph is a visual depiction of a directed graph that displays data in a hierarchical format. It illustrates a staged break down of a data set over a series of one or more dimensions. Subsequent levels of the decomposition graph break the data down into smaller subsets by applying a new dimension. For example, data on the third level of a decomposition graph may be broken down by year, geography and product. A decomposition graph differs from a decomposition tree in that a node can have more than one parent.

A node is a visual depiction of a component of a decomposition graph A node is depicted in a specific level of a decomposition graph hierarchy. A node is depicted in relation to other nodes within a decomposition graph. A node is associated with a data set and can contain a measure visualization.

A measure is a type of data model object that describes an aggregation of underlying data values based on governing dimensions. In the case of an OLAP data source, the measure may be defined directly in the source data. In the case of a relational data source, a column (or query expression), aggregation type, and governing dimensions are defined for the base measure. Types of aggregations include sum, count, maximum, minimum, average, first child, last child, and the like. Measures can be used to represent values associated with business concepts such as profit, revenue, attrition, growth and the like. These types of measures are generally calculated measures.

A calculated measure is a type of measure that involves a combination of a mathematical computation and an aggregation. Types of calculated measures are profit, revenue, attrition, growth, margin, and the like.

A measure visualization displays measure values. A measure visualization shows one or more measures for one or more dimension members illustrating a relationship between the values. This relationship can be shown in the form of a comparison, an aggregation and the like. To provide a comparison, a measure visualization must show at least one measure for two dimension members or two measures for one dimension member. To provide an aggregation, a measure visualization must show at least one measure aggregated over at least two dimension members.

A dimension is a type of data model object that represents a side of a multidimensional cube, a category, a column or a set of data items within a data source. Each dimension represents a different category, such as region, time, or product type. Dimension definitions support the specification of hierarchies to form a hierarchical dimension where dimension levels are constrained by hierarchical logic. Members of a dimension may be defined through a filter or transform.

A decomposition dimension is a dimension corresponding to a level of nodes in a decomposition graph. The members of a decomposition dimension, represented by nodes, are used to determine how to break down the data provided by the preceding level.

A data source is an information resource. Data sources include sources of data that enable data storage and retrieval. Data sources may include databases, such as, relational, transactional, hierarchical, multidimensional (e.g., OLAP), object oriented databases, and the like. Further data sources may include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC) and the like. Data sources may also include a data source where the data is not stored like data streams, broadcast data, and the like.

A data filter is selection criteria used for retrieving relevant data from a data source, or a subset of previously received data.

A visualization is a graphic display of quantitative information. Types of visualizations include charts, tables and maps.

A chart includes a collection of visual elements used to convey information. Data is converted to a pictorial representation such as a line, representative area, color and the like.

A table displays a set of data into a series of columns and rows. The table can have row and column headings, where each cell in a table can show the value associated with the specific combination of row and column headings. Some tables can hold charts or maps in their cells; this is a spatially economic way to display many charts with common axes. To facilitate representation in two dimensions, higher-dimensional tables of data are often represented using a plurality of two dimensional tables.

A map is a simplified depiction of a space that highlights relations between elements in the space. Typically, a map is a planar, geometrically accurate representation of a space. A map is not limited to a two dimensional cartographic map. A map can be augmented to include extra information presented in the form of an added element, e.g., height, color, density. A map may include other visualizations in regions of the map, e.g., a map with pie charts in each region.

Figure 1:
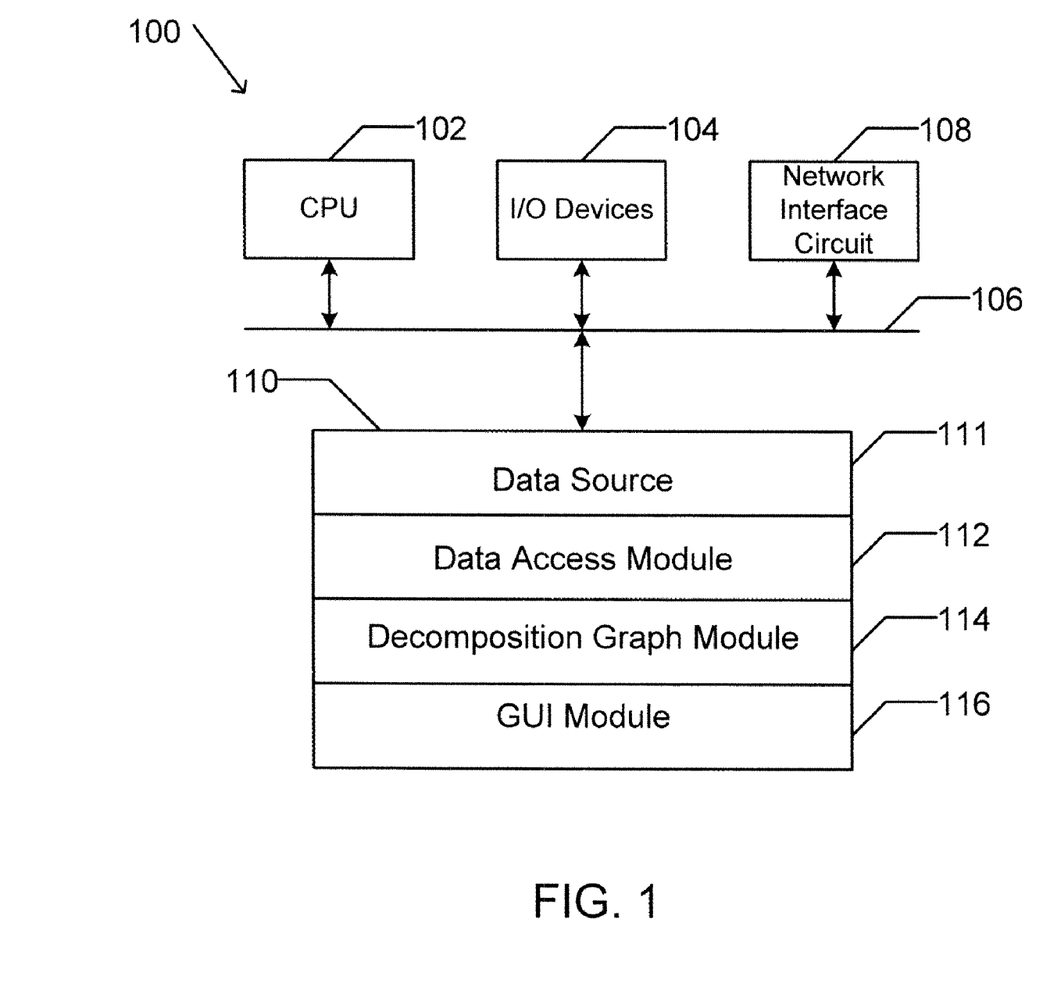
FIG. 1 illustrates a computer constructed in accordance with an embodiment of the invention.

FIG. 1 illustrates a computer 100 configured in accordance with an embodiment of the invention. The computer 100 includes standard components, including a central processing unit 102 and input/output devices 104, which are linked by a bus 106. The input/output devices 104 may include a keyboard, mouse, touch screen, monitor, printer, and the like. A network interface circuit 108 is also connected to the bus 106. The network interface circuit (NIC) 108 provides connectivity to a network (not shown) thereby allowing the computer 100 to operate in a networked environment.

A memory 110 is also connected to the bus 106. In an embodiment, the memory 110 stores one or more of the following modules: a data source 111, a data access module 112, a decomposition graph module 114 and a Graphical User Interface (GUI) module 116.

The data source 111 stores and supplies data for the data access module 112. In an embodiment, the data source resides on a separate machine. The data access module 112 extracts data from the data source when required, constructs data filters, accesses the data source, and filters and groups the data as requested. The decomposition graph module 114 constructs the decomposition graph and accepts user input from the GUI module 116. The GUI module 116 displays the decomposition graphs created by the decomposition graph module 114 and accepts user input. The GUI module 116 may rely upon standard techniques to produce graphical components of a user interface, e.g., windows, icons, buttons, menu and the like, examples of which are discussed below.

The executable modules stored in memory 110 are exemplary. Additional modules such as an operating system module may also be included. It should be appreciated that the functions of the modules may be combined. In addition, the functions of the modules need not be performed on a single machine. Instead, the functions may be distributed across a network, if desired. Indeed, the invention is commonly implemented in a client-server environment with various components being implemented at the client-side and/or the server-side. It is the functions of the invention that are significant, not where they are performed or the specific manner in which they are performed.

Figure 2:
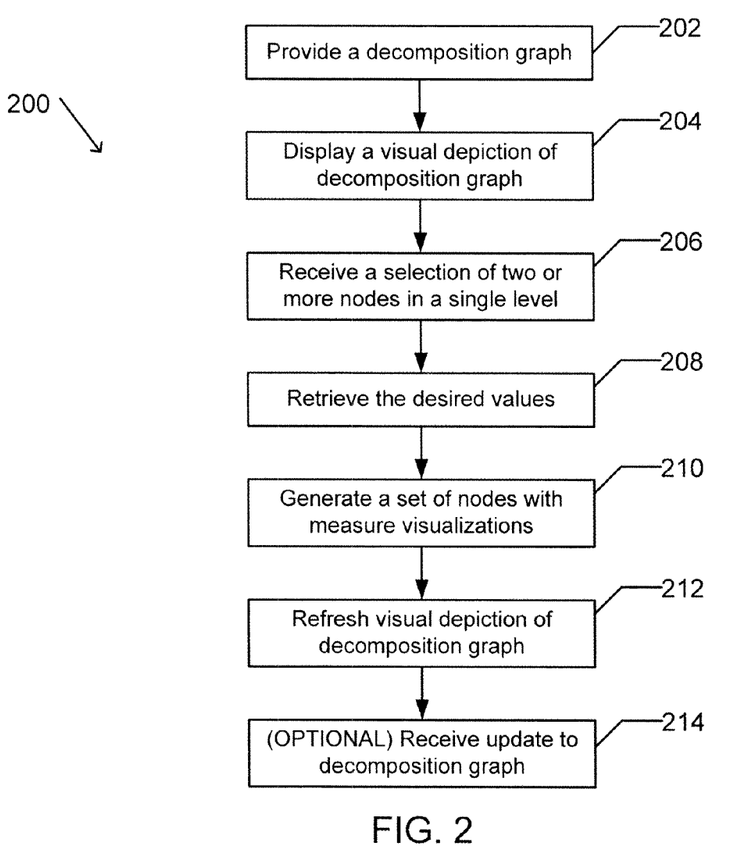
FIG. 2 illustrates a first set of processing operations associated with an embodiment of the invention.

FIG. 2 illustrates a high level workflow 200 associated with an embodiment of the invention. Initially, the decomposition graph module 114 provides a decomposition graph 202 to the GUI module 116, which the GUI module 116 displays to the user 204. The decomposition graph module 114 receives a selection of two or more nodes in a single level 206 via the GUI module 116. The data access module 112 creates a new set of data filters, retrieves the values 208 from the data source 111 and passes them to the decomposition graph module 114. In an embodiment, the values are measures. In an embodiment, the values comprise a filtered data set. The decomposition graph module 114 generates a set of nodes with measure visualizations 210.

In an embodiment, a node in a decomposition graph is associated with one or more data filters, and therefore, one or more filtered data sets or measures. In an embodiment, the data filters return data sets from which the measures are aggregated by the data access module 112. In an embodiment, the data filters return measures that have been calculated on the data source side. When a node is selected, its associated data filter is the basis for the data filter in its child node(s). When two or more nodes are selected, multiple data filters are associated with the child node(s) in the subsequent level. These data filters are used to select a number of data sets or measures which are displayed in a comparison or aggregation format. All selected nodes are parents of all nodes in the subsequent level. In an embodiment, a node in a decomposition graph contains a measure visualization representation of the associated data set(s) or measure(s). In an embodiment, the measure visualizations illustrate a comparison between the data supplied by the selected nodes or an aggregation of the data supplied by the selected nodes. In an embodiment, the set of nodes is a new set of nodes to be added to the decomposition graph. In an embodiment, the set of nodes is an existing set of nodes in the decomposition graph that will be populated with new measure visualizations.

Next, the GUI module 116 refreshes the visual depiction of the decomposition graph 212. The decomposition graph module 114 can optionally receive an update to the decomposition graph 214 via the GUI module 116.

Figure 3:
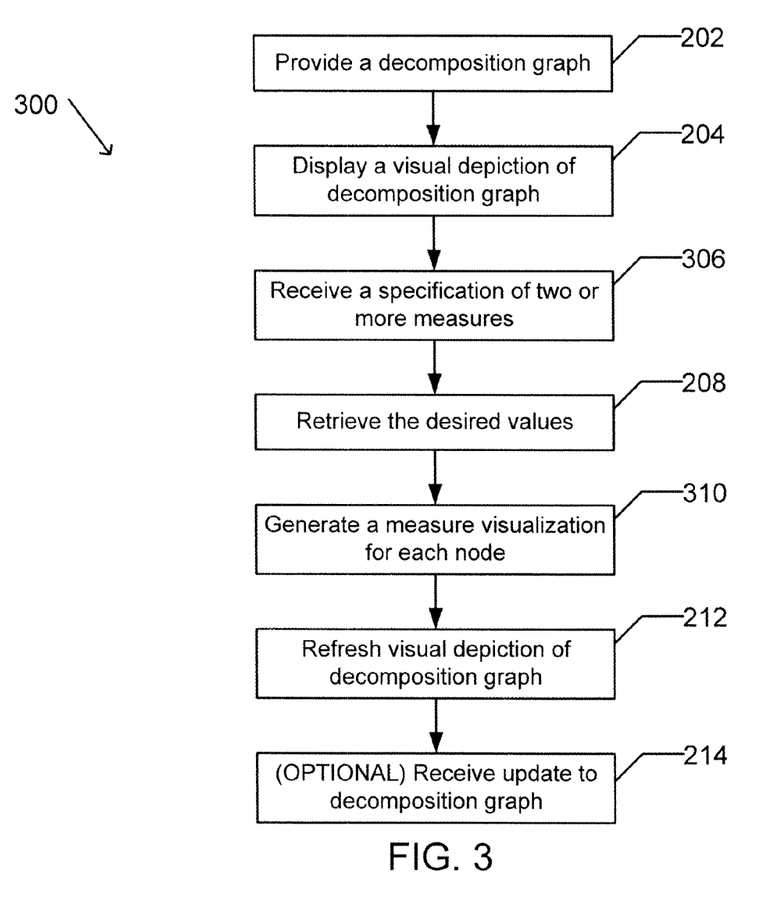
FIG. 3 illustrates a second set of processing operations associated with an embodiment of the invention.

FIG. 3 illustrates a high level workflow 300 associated with an embodiment of the invention. A decomposition graph is provided 202 and a visual depiction of the decomposition graph is displayed 204. These are the same initial operations shown in FIG. 2. The decomposition graph module 114 receives the specification of two or more measures 306. These measures indicate how the data for a node is aggregated. The data access module 112 updates the data filters and retrieves the desired values 208. The decomposition graph module 114 then generates a measure visualization for each node in the decomposition graph 310, illustrating the relationship between the specified measures. In an embodiment, the relationship is a comparison. In an embodiment, the relationship is an aggregation. In an embodiment, different symbols are used to represent each measure in the measure visualization. The GUI module 116 refreshes the visual depiction of the decomposition graph 212 and the decomposition graph module 114 can optionally receive an update to the decomposition graph 214 via the GUI module 116.

Figure 4:
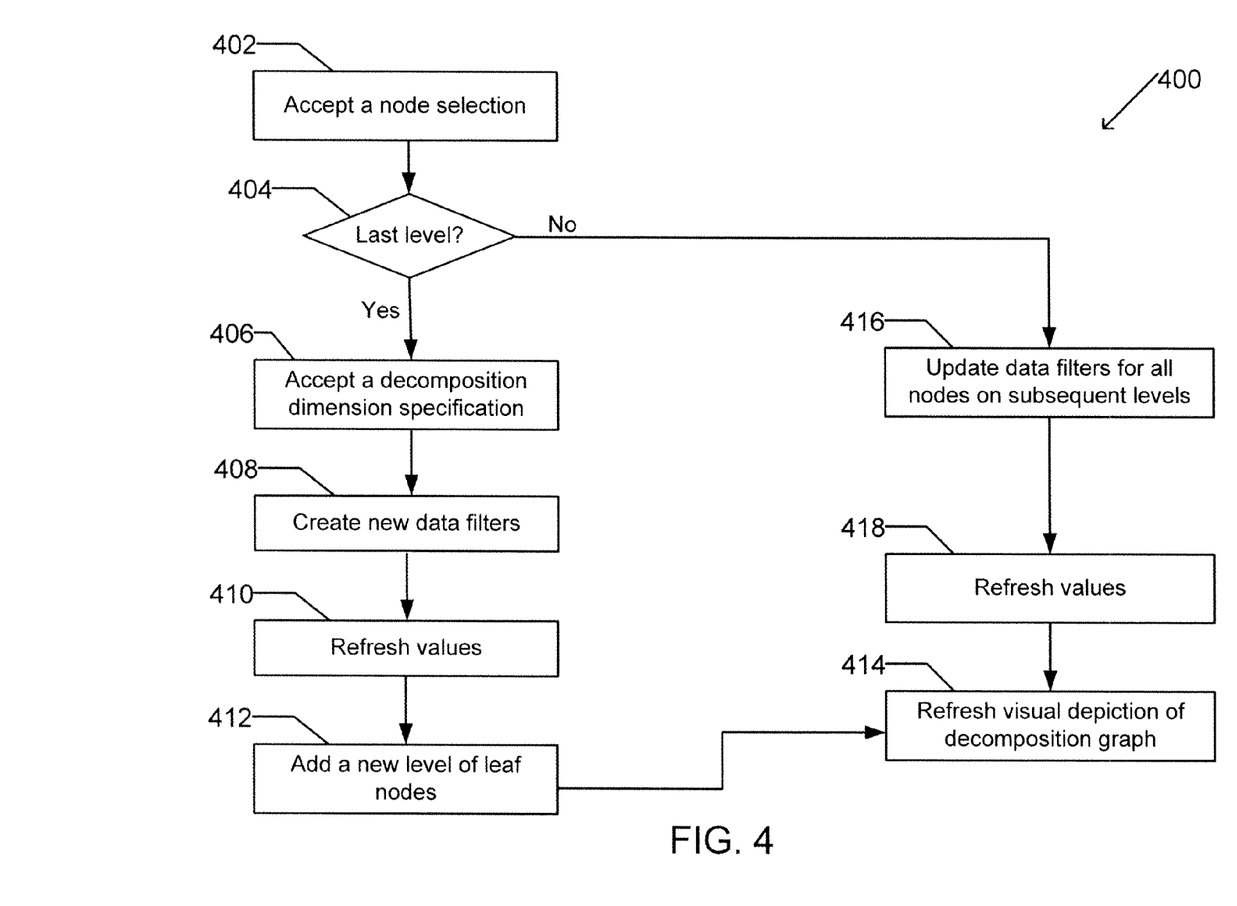
FIG. 4 illustrates processing operations for selecting nodes associated with an embodiment of the invention.

FIG. 4 illustrates a series of processing operations 400 which may be implemented by the computer 100 of FIG. 1 to update the decomposition graph when a node selection update is received. The first operation is for the decomposition graph module 114 to accept the node selection 402. For simplicity, the following operations are explained as if a single node is selected, but the same logic can be applied to a multiple node selection. The decomposition graph module 114 checks whether the selection happened on the last level of the decomposition graph 404. If it is the last level, 404—Yes, then in an embodiment the decomposition graph module also requires a decomposition dimension. In another embodiment, this operation is optional and the decomposition dimension is selected from a default value. The decomposition graph module 114 accepts a decomposition dimension specification 406 and the data access module 112 creates a new set of data filters 408. The new data filters break down the data sets or measures associated with the selected nodes by the selected decomposition dimension. The data access module 112 refreshes the values 410 and the decomposition graph module adds a new level of leaf nodes representing the specified decomposition dimension 412. Then, the GUI module 116 refreshes the visual depiction of the decomposition graph 414. If the selection occurred in an upper level, 404—No, then the data access module 112 updates the data filters to include the new dimension member for all levels subsequent to the level of the selected node 416. Then, the data access module 112 refreshes the values 418, and the GUI module 114 refreshes the visual depiction of the decomposition graph 414.

In an embodiment, a previously selected node or set of nodes can be updated with a new decomposition dimension. In an embodiment, a new level, broken down by the new decomposition dimension, is added immediately subsequent to the level containing the updated nodes. In an embodiment, the immediately subsequent level is replaced by a new level broken down by the new decomposition dimension and the data filters and data are updated for all subsequent levels. In an embodiment, all subsequent levels are removed and replaced by a new level broken down by the new decomposition dimension.

In an embodiment, the decomposition dimension is based on a data source with hierarchical dimensions. With each additional decomposition dimension added, the user has a more limited group of decomposition dimensions to choose from. The group is limited to those dimensions that are lower in the dimension hierarchy than the dimensions already specified as decomposition dimensions. In an embodiment, there is no restriction on the order that dimensions may be added as decomposition dimensions.

In the event that a node is de-selected, the data access module 112 updates the data filters and refreshes the data for all subsequent levels. In an embodiment, the GUI module 116 refreshes the visual depiction of the decomposition graph, but the structure of the decomposition graph is not updated. In an embodiment, the structure of the decomposition graph is also updated. In the case where a level does not have any selected nodes after the de-selection, the subsequent level or all subsequent levels are removed before updating the data filters and refreshing the data.

Figure 5:
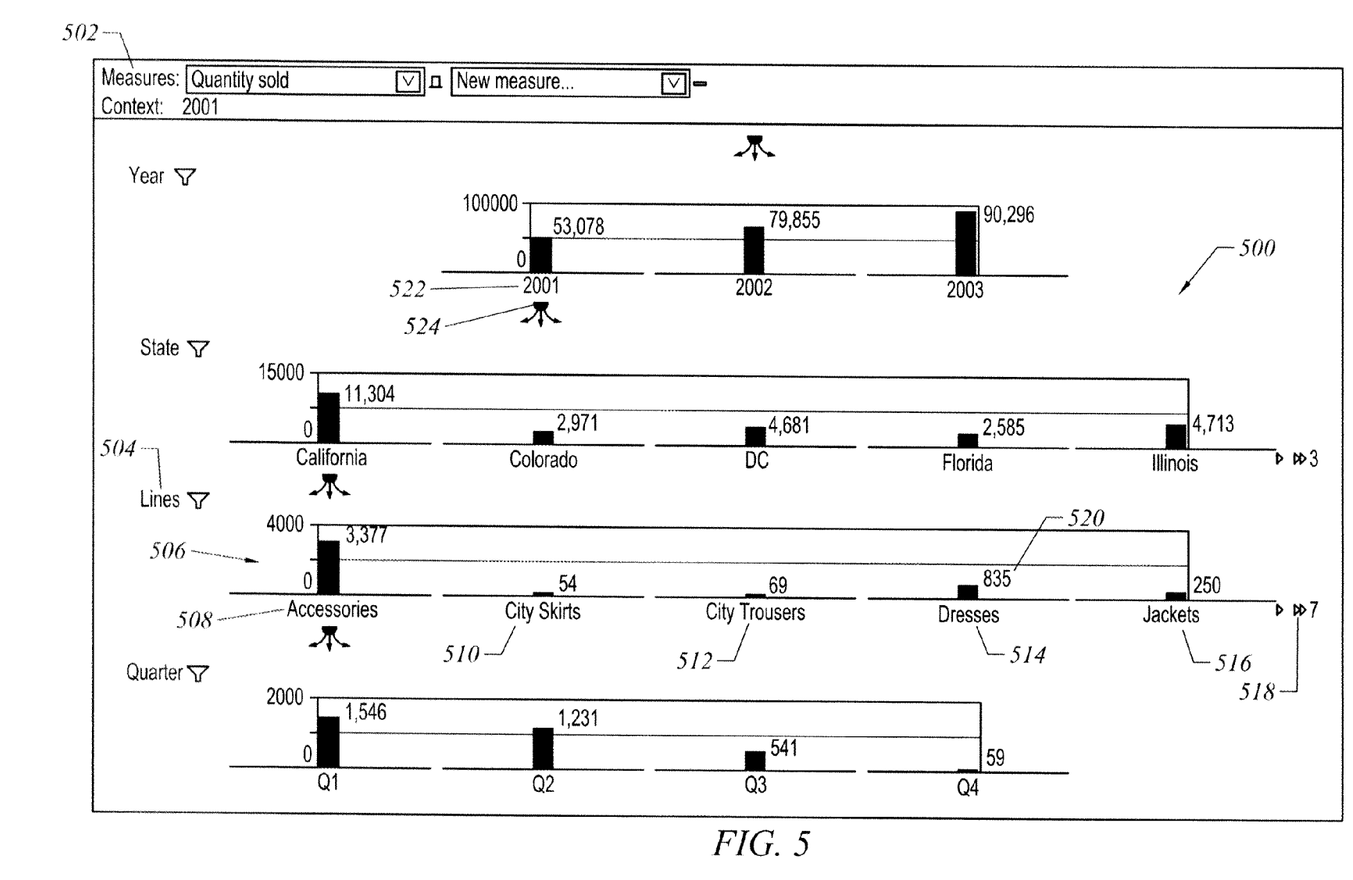
FIG. 5 illustrates a decomposition graph configured in accordance with an embodiment of the invention.

FIG. 5 illustrates a decomposition graph 500 configured in accordance with an embodiment of the invention. The "Measures" option 502 indicates the currently selected measure(s), in this case "Quantity sold," and allows users to add and remove measures. The measure selection determines how data will be aggregated in the decomposition graph 500. The decomposition graph is constructed with a number of levels, each representing a decomposition dimension, such as "Lines" 504, i.e., lines of clothing. The series of charts 506 shows quantity sold data for attributes of the dimension "Lines" 504. In this example, the decomposition graph nodes contain charts, but the nodes can contain other types of visualizations such as maps and tables. Each chart in the series of charts 506 represents a single node in the decomposition graph 500, as well as an attribute in the "Lines" dimension 504 such as "Accessories" 508, "City Skirts" 510, "City Trousers" 512, "Dresses" 514 and "Jackets" 516. In an embodiment, additional nodes that do not fit on the screen can be accessed by scrolling through the level using the scroll buttons 518. In an embodiment, in addition to a visual representation of the data, totals for each aggregate value are also included, such as "835" 520 for "Dresses" 514. Selected nodes are shown by an indicator such as a background color, a visualization color, a bolded label as illustrated by "2001" 522, an additional icon such as the split arrow icon 524 and the like.

Figure 6:
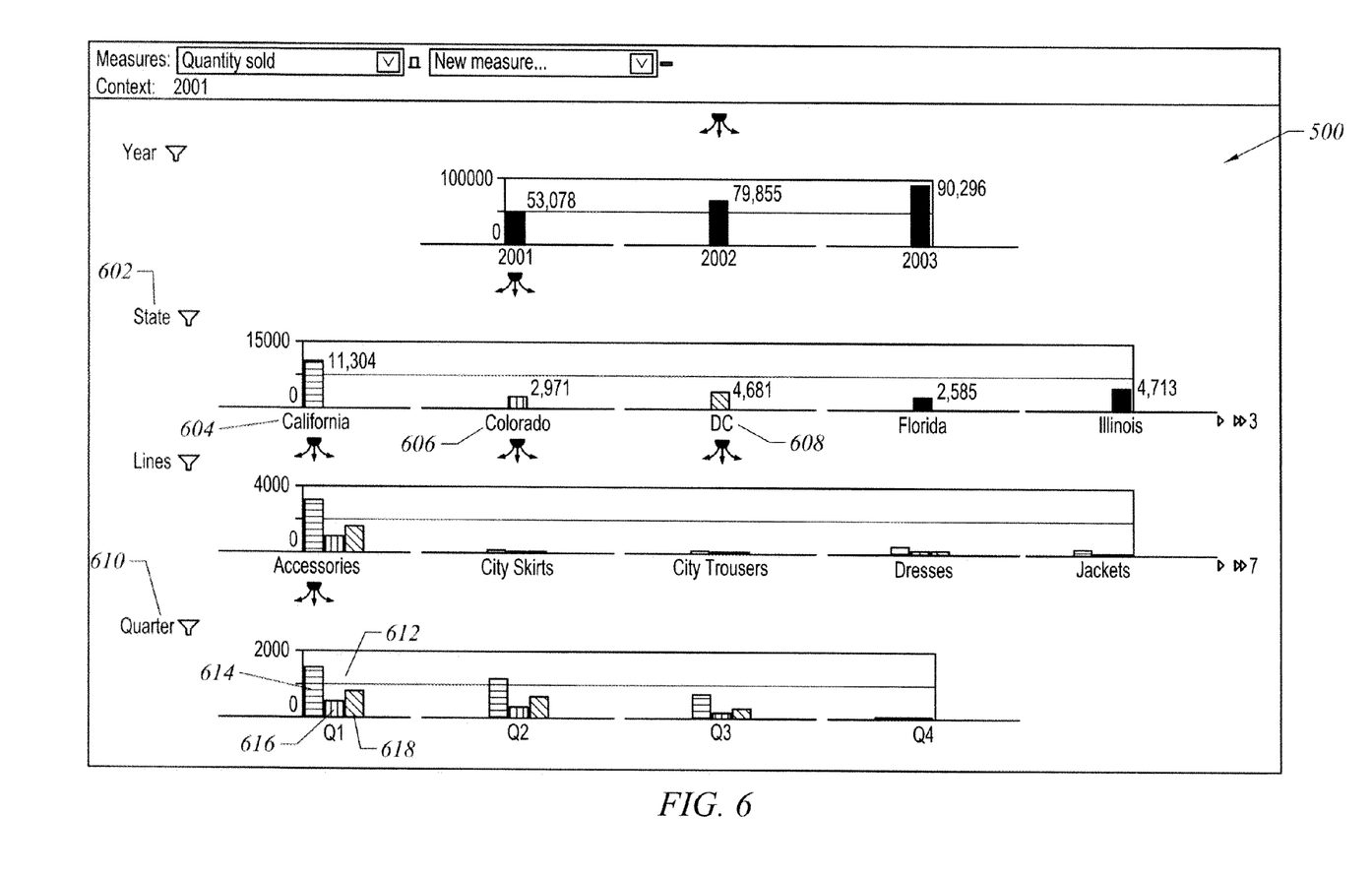
FIG. 6 illustrates a comparison between data for three dimension members in the decomposition graph of FIG. 5 in accordance with an embodiment of the invention.

FIG. 6 illustrates the decomposition graph 500 of FIG. 5 with multiple nodes selected for comparison in the "State" decomposition dimension 602 configured in accordance with an embodiment of the invention. The nodes "California" 604, "Colorado" 606 and "DC" 608 are all selected as indicated by their bolded labels. In an embodiment, when multiple nodes are selected in a single level, the data values are differentiated by some form of varied color, shade, pattern or texture and the like. In this case, "California" 604 is indicated by horizontal stripes, "Colorado" 606 is indicated by vertical stripes and "DC" 608 is indicated by diagonal stripes. These textures are useful for differentiating data value representations in subsequent levels containing comparison visualizations, such as "Quarter" 610. The node "Q1" 612 contains a comparison chart illustrating the quantity of accessories sold in California, Colorado and DC in the first quarter of 2001. The horizontally striped bar 614 indicates the quantity sold in California, the vertically striped bar 616 indicates the quantity sold in Colorado and the diagonally striped bar 618 indicates the quantity sold in DC.

In an embodiment, an aggregation mode can be selected. When multiple nodes are selected in the aggregation mode, the subsequent level of nodes will display the data as an aggregation rather than a comparison. For example, instead of showing three bars, one for the quantity sold of each of three products associated with the selected nodes, the aggregation mode shows one bar indicating the tally of the quantity sold of all three products.

Figure 7:
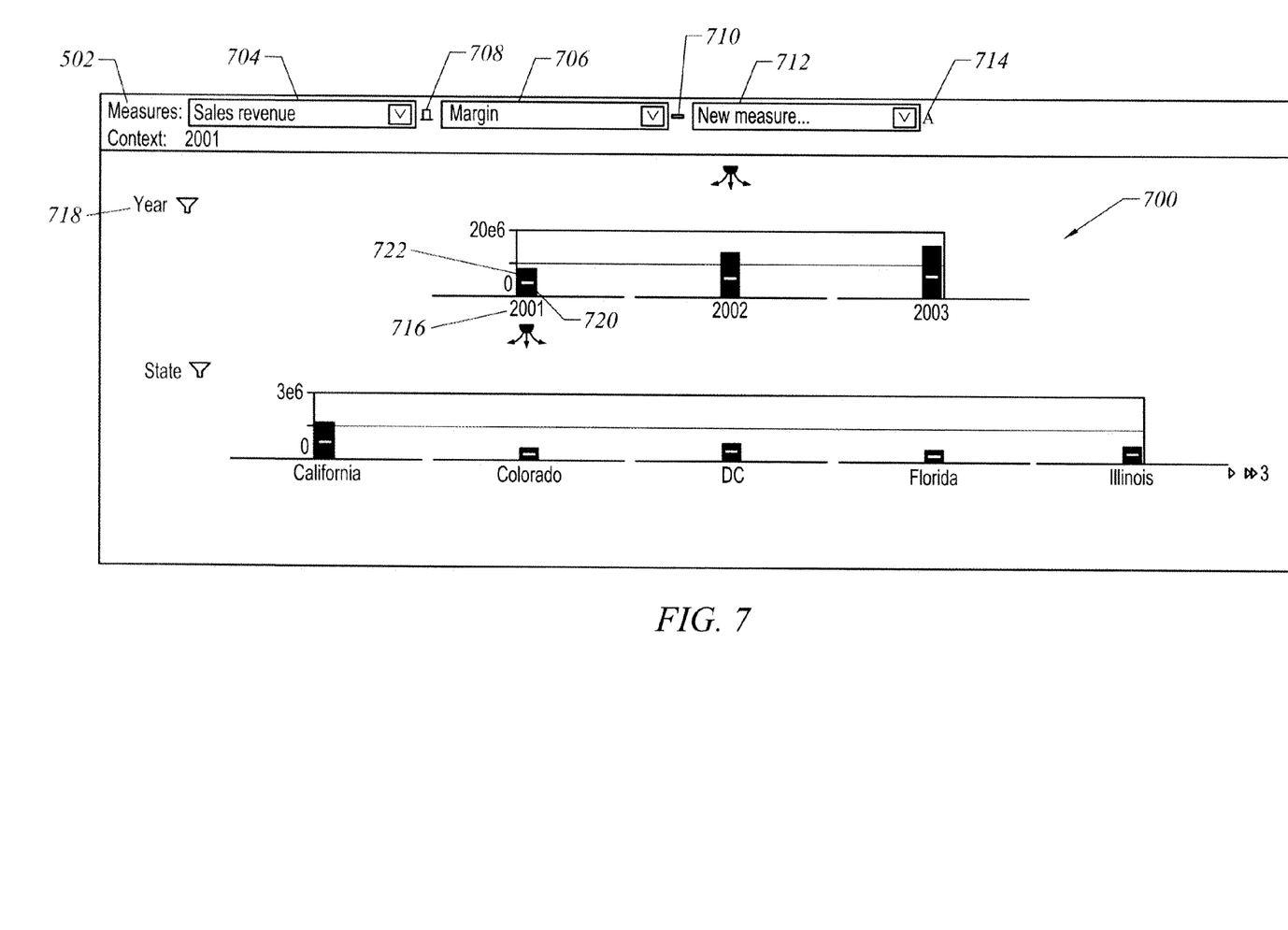
FIG. 7 illustrates a decomposition graph displaying two measures configured in accordance with an embodiment of the invention.

FIG. 7 illustrates the use of two measures within a decomposition graph 700 configured in accordance with an embodiment of the invention. The "Measures" option 502 allows the user to indicate the measure or measures to show in the decomposition graph 700. In this example, the decomposition graph shows "Sales revenue" 704 and "Margin" 706. The symbol beside each measure indicates how the measure will appear in the visualizations in the decomposition graph. For example, "Sales revenue" 704 appears as vertical rectangle 708 and "Margin" 706 appears as a horizontal bar 710. The "Measures" option 502 allows the user to add new measures using the "New measure" option 712 and indicates that the new measure will appear in the visualizations as an arrow 714. The user is able to view the relationship between two or more measures for two or more dimension members. In the decomposition graph 700, the dimension member node "2001" 716 in the decomposition dimension level "Year" 718 shows a "Sales revenue" value 720 and a "Margin" value 722.

Figure 8:
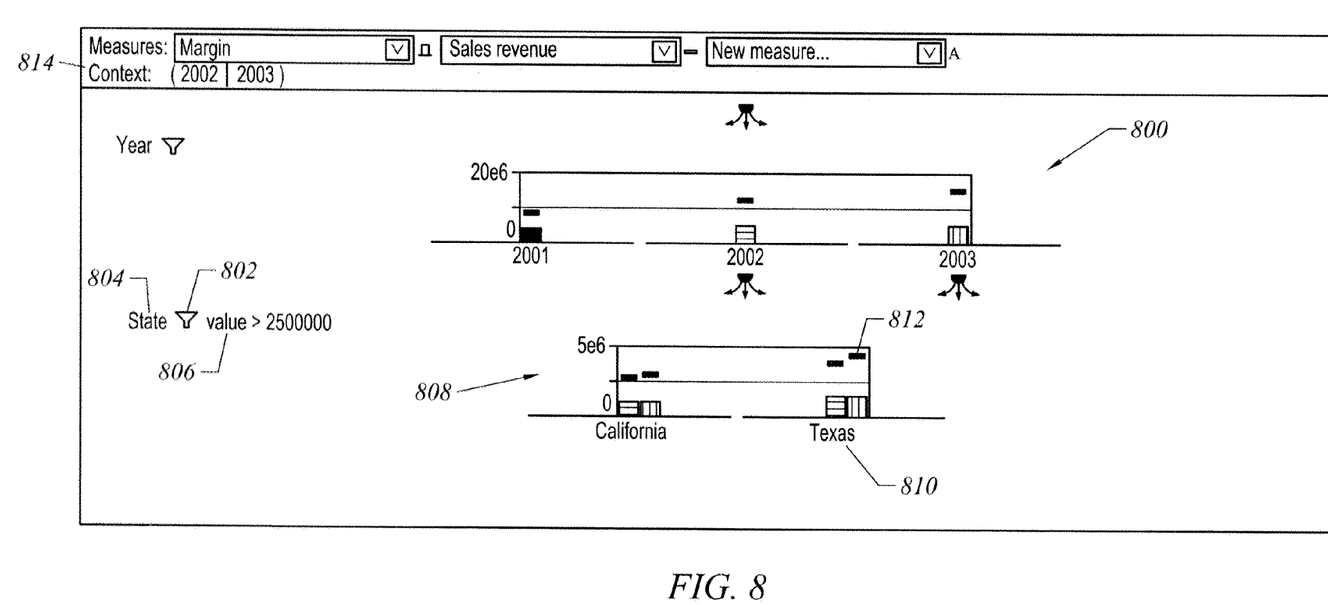
FIG. 8 illustrates applying a measure filter to a decomposition graph configured in accordance with an embodiment of the invention.

FIG. 8 illustrates the application of a measure filter on the decomposition graph 800. In an embodiment, filters can be applied to a decomposition graph based on measure. In an embodiment, a measure filter selects nodes that have at least one measure value that meets the constraint set by the measure filter. All other nodes are hidden. In an embodiment, the user can define measure filters via a filter icon such as 802. In this example, the decomposition dimension "State" 804 has been filtered by "value>2500000" 806. In this case, the term "value" in the filter 806 refers to measure value. As a result, only nodes with at least one measure value greater than 2500000 are shown 808. The dimension member "Texas" 810 has a 2003 sales revenue of approximately 4,000,000 as indicated by the bar 812, so it is displayed. In an embodiment, node selections are also indicated as a context description 814.

Data filters are constructed based on node selections, measure specifications and decomposition dimension specifications indicated in the decomposition graph. In an embodiment, dimension members in different levels of the decomposition graph are related by an "and" operator in the data filter and dimension members in the same level of the decomposition graph are related by an "or" operator in the data filter. The data filter is used to retrieve a subset of data from the data source.

Additional filters can be applied to levels in a similar fashion to measure filters. The user can specify a filter that will be added to the data filters for all nodes in the level. Rather than being applied to node selection, these filters will be applied to the actual data selection. For example, a user can specify a filter on a "State" decomposition dimension such as "state LIKE 'C %'." This limits data selection to those states starting with a "C." The SQL syntax used in the above example is not a limitation of the invention. Indeed, filter specification can be done in any desired syntax.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, comprising executable instructions to:
provide a decomposition graph visualization that is based on a set of hierarchical dimensions comprising a set of levels of nodes, wherein each level of nodes is associated with a corresponding decomposition dimension and each level of nodes includes a graphical visualization for each node, wherein the graphical visualization is a graphic display of quantitative information associated with a corresponding attribute of each respective node, the displayed quantitative information being filtered and the filtered quantitative information being further displayed, the filtering comprising (i) filtering data that does not comply with a dimension filter, and (ii) performing a comparison of some of the displayed quantitative information with a predetermined threshold;
receive a selection of two or more nodes from a single level in the set of levels of nodes, wherein a node in a level corresponds to one or more dimension members of the dimension associated with the single level;
generate, based on the filtering, a new level of nodes, wherein each node in the new level of nodes displays a graphical measure visualization comprising separate quantitative data for respective dimension members corresponding to the received two or more nodes; and
update the measure visualization when an alteration is made to the decomposition graph visualization;
wherein:
a specification of the decomposition dimension is accepted from one of a previously selected decomposition dimension, a default value and a user input;
a hierarchy is extracted from the set of hierarchical dimensions, the hierarchy enforcing an order for specifying decomposition dimensions, the enforcing being based on the data that is filtered out.

2. The computer readable storage medium of claim 1, wherein the measure visualization illustrates a comparison of the data for the dimension members corresponding to the two or more nodes.

3. The computer readable storage medium of claim 1, wherein the measure visualization illustrates an aggregation of the data for the dimension members corresponding to the two or more nodes.

4. The computer readable storage medium of claim 1, wherein data in the measure visualization in a node in the new level of nodes is filtered by a data filter comprising all dimension member selections in all preceding levels and the one or more dimension members corresponding to the node.

5. The computer readable storage medium of claim 1, wherein the new level of nodes is appended to the decomposition graph visualization.

6. The computer readable storage medium of claim 1, wherein the new level of nodes replaces an existing level of nodes.

7. The computer readable storage medium of claim 6 further comprising executable instructions to alter one or more levels of nodes subsequent to the existing level of nodes, wherein altering is selected from updating and removing.

8. The computer readable storage medium of claim 1, wherein the new level of nodes corresponds to the decomposition dimension.

9. The computer readable storage medium of claim 1 further comprising executable instructions to accept a selection of one or more measures to be used in quantifying data in the measure visualization of a node.

10. The computer readable storage medium of claim 4, wherein any two selected dimension members in different levels are related by an "and" operator in the data filter.

11. The computer readable storage medium of claim 4, wherein any two selected dimension members in a single level are related by an "or" operator in data filter.

12. The computer readable storage medium of claim 1 further comprising executable instructions to update the measure visualization when an alteration is made to the decomposition graph visualization.

13. The computer readable storage medium of claim 12, wherein the alteration is selected from one or more of updating a measure specification, adding a new measure specification, removing a measure specification, updating a dimension member selection, adding a new dimension member selection, removing a dimension member selection, refreshing data, updating a decomposition dimension, adding a new decomposition dimension and removing a decomposition dimension.

14. A system comprising:
at least one programmable processor; and
a non-transitory machine-readable medium storing instructions that, when executed by the at least one processor, cause the at least one programmable processor to perform operations comprising:
providing a decomposition graph visualization that is based on a set of hierarchical dimensions comprising a set of levels of nodes, wherein each level of nodes is associated with a corresponding decomposition dimension and each level of nodes includes a graphical visualization for each node, wherein the graphical visualization is a graphic display of quantitative information associated with a corresponding attribute of each respective node, the displayed quantitative information being filtered and the filtered quantitative information being further displayed, the filtering comprising (i) filtering data that does not comply with a dimension filter, and (ii) performing a comparison of some of the displayed quantitative information with a predetermined threshold;

receiving a selection of two or more nodes from a single level in the set of levels of nodes, wherein a node in a level corresponds to one or more dimension members of the dimension associated with the single level;

generating, based on the filtering, a new level of nodes, wherein each node in the new level of nodes displays a graphical measure visualization comprising separate quantitative data for respective dimension members corresponding to the received two or more nodes; and updating the measure visualization when an alteration is made to the decomposition graph visualization;

wherein:
  a specification of the decomposition dimension is accepted from one of a previously selected decomposition dimension, a default value and a user input;
  a hierarchy is extracted from the set of hierarchical dimensions, the hierarchy enforcing an order for specifying decomposition dimensions, the enforcing being based on the data that is filtered out.

15. The system of claim 14, wherein the new level of nodes corresponds to the decomposition dimension.

16. A method for implementation by one or more data processors comprising:

providing a decomposition graph visualization that is based on a set of hierarchical dimensions comprising a set of levels of nodes, wherein each level of nodes is associated with a corresponding decomposition dimension and each level of nodes includes a graphical visualization for each node, wherein the graphical visualization is a graphic display of quantitative information associated with a corresponding attribute of each respective node, the displayed quantitative information being filtered and the filtered quantitative information being further displayed, the filtering comprising (i) filtering data that does not comply with a dimension filter, and (ii) performing a comparison of some of the displayed quantitative information with a predetermined threshold;

receiving a selection of two or more nodes from a single level in the set of levels of nodes, wherein a node in a level corresponds to one or more dimension members of the dimension associated with the single level;

generating, based on the filtering, a new level of nodes, wherein each node in the new level of nodes displays a graphical measure visualization comprising separate quantitative data for respective dimension members corresponding to the received two or more nodes; and updating, by using a computer, the measure visualization when an alteration is made to the decomposition graph visualization;

wherein:
  a specification of the decomposition dimension is accepted from one of a previously selected decomposition dimension, a default value and a user input;
  a hierarchy is extracted from the set of hierarchical dimensions, the hierarchy enforcing an order for specifying decomposition dimensions, the enforcing being based on the data that is filtered out.

17. The method of claim 14, wherein the new level of nodes corresponds to the decomposition dimension.

* * * * *